United States Patent
Koyama et al.

(10) Patent No.: US 7,697,105 B2
(45) Date of Patent: *Apr. 13, 2010

(54) DISPLAY DEVICE INCLUDING A PARALLAX BARRIER

(75) Inventors: Yoshihide Koyama, Matsusaka (JP); Hiroshi Fukushima, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 159 days.

This patent is subject to a terminal disclaimer.

(21) Appl. No.: 11/994,871

(22) PCT Filed: Jun. 28, 2006

(86) PCT No.: PCT/JP2006/312881

§ 371 (c)(1), (2), (4) Date: Jan. 7, 2008

(87) PCT Pub. No.: WO2007/007552

PCT Pub. Date: Jan. 18, 2007

(65) Prior Publication Data

US 2009/0066864 A1    Mar. 12, 2009

(30) Foreign Application Priority Data

Jul. 11, 2005   (JP) .............................. 2005-202284

(51) Int. Cl.
*G02F 1/1339* (2006.01)
*G02F 1/1335* (2006.01)
*G02F 1/1333* (2006.01)

(52) U.S. Cl. .................... 349/153; 349/15; 349/110; 349/190

(58) Field of Classification Search ................ 349/153, 349/15, 190, 110
See application file for complete search history.

(56) References Cited

U.S. PATENT DOCUMENTS

| 7,365,809 B2 * | 4/2008 | Tanaka et al. ................. 349/15 |
| 2005/0243253 A1 * | 11/2005 | Imai et al. .................... 349/122 |
| 2006/0164578 A1 * | 7/2006 | Matsumoto et al. ......... 349/117 |
| 2009/0086150 A1 * | 4/2009 | Koyama et al. ............. 349/153 |

FOREIGN PATENT DOCUMENTS

| GB | 2 405 542 A | 3/2005 |
| JP | 08-106070 A | 4/1996 |
| JP | 10-268232 A | 10/1998 |
| JP | 10268232 A * | 10/1998 |
| WO | 2005/071474 A2 | 8/2005 |

OTHER PUBLICATIONS

Official communication issued in the International Application No. PCT/JP2006/312881; mailed on Aug. 15, 2006.
Yoshihide Koyama et al.; "Display Device"; U.S. Appl. No. 11/994,873, filed Jan. 7, 2008.

* cited by examiner

*Primary Examiner*—Mike Qi
(74) *Attorney, Agent, or Firm*—Keating & Bennett, LLP

(57) ABSTRACT

A display device includes a display panel and a parallax barrier bonded together with an adhesive layer made of a light-curing resin (for example, ultraviolet curing resin). The display device allows 3D display or multiple-image display. The parallax barrier includes a pattern-formed light-shielding layer on barrier glass. The parallax barrier has an area that does not include the light-shielding layer on the periphery portions thereof. Thus, with the display device including the parallax barrier and the display panel bonded together, peeling on adhesive planes of the parallax barrier and display panel is less likely to occur.

7 Claims, 9 Drawing Sheets

- - - - -> RIGHT-EYE IMAGE
- - - · -> LEFT-EYE IMAGE

- - - · -> FIRST IMAGE
- - - - -> SECOND IMAGE

DISPLAY DEVICE INCLUDING A PARALLAX BARRIER

BACKGROUND OF THE INVENTION

1. Field of the Invention

The present invention relates to a display device including a display panel and a parallax barrier in combination and is capable of displaying different images towards a plurality of display directions, respectively.

2. Description of the Related Art

Display devices displaying different images towards a plurality of viewpoints have been proposed as 3D display devices in which an image generation unit and a viewing angle control unit such as a parallax barrier are used in combination. With these 3D display devices, as illustrated in FIG. 6, a certain viewing angle is provided by viewing angle control units 102 arranged outside image generation unit 101. The viewing angle control units 102 are provided for the right-eye image and left-eye image generated by image generation unit 101. Thus, as illustrated in FIG. 7, if the display is viewed from a certain observation area, only the images corresponding to each eye is visually perceived, and a 3D image is recognized by the observer.

Also, by combining the image generation unit and the viewing angle control unit, the use of the display device being able to display different images towards a plurality of viewpoints is not limited to such 3D displays. For example, it is also applicable for use in displays that display different images towards a plurality of observers (hereafter referred as multiple-image display). In other words, with 3D displays, as illustrated in FIG. 8A, the right-eye image and the left-eye image separated by the viewing angle, is observed by the observer's right-eye and left-eye, respectively. On the other hand, with multiple-image display, as illustrated in FIG. 8B, a first image and a second image separated by the viewing angle are observed by different observers, respectively.

FIG. 9 is a schematic cross sectional view illustrating an example of a display device in which an image generation unit and a viewing angle control unit are combined. The display device described in this diagram includes a display panel 110, a parallax barrier 120, a backlight 130, and polarizers 141 and 142. FIG. 9 illustrates a structure using a transmissive type liquid crystal display panel as a display panel 110.

The backlight 130, as described in FIG. 9, includes a light source 131 and a reflection plate 132, and by reflecting the light irradiated from a light source 131 with a reflection plate 132, light is irradiated towards a display panel 110.

The display panel 110 is an active-matrix type liquid crystal display panel, including a liquid crystal layer 113 sandwiched between two glass substrates 111 and 112 facing each other.

The pixels each, as described in FIG. 9, are arranged parallel to the extending direction of the data signal lines (not illustrated), with pixel column L for the left-side image display (image display towards the left side of the display device) and pixel column R for the right-side image display (image display towards the right side of the display device) arranged alternately.

Also, on the surfaces of the glass substrates 111 and 112, which face each other, an alignment film (not illustrated) is provided. The alignment film has been subjected to an alignment process in directions orthogonal to each other at right angles. Each alignment film has been rubbed in each direction parallel to the surface of the substrate. The polarizer 141 is provided on the side of the glass substrate 111 that faces the backlight 130. The polarizer 142 is provided on a displaying side of the parallax barrier 120 which is opposite to the side thereof which is opposite to (backlight 130).

The parallax barrier 120 includes a barrier glass 121 and a light-shielding layer 122. The light-shielding layer 122 is irradiated by the backlight 130, and by blocking a portion of the light transmitted through display panel 110, the light-shielding layer 122 is specific to the display images.

Also, the parallax barrier 120 and display panel 110 are bonded with a resin layer 151 with a certain space therebetween.

However, the conventional structure has a problem in that after the bonding of parallax barrier 120 and display panel 110, peeling of the parallax barrier 120 readily occurs. The explanation of the problem is as follows.

Firstly, the parallax barrier 120 is generally smaller in size than a bonding substrate of the display panel 110 to which the parallax barrier 120 is bonded, so that the parallax barrier 120 can be bonded together with the display panel 110 without protruding from an outer edge of the display panel 110 (in order to prevent hooking and cracks).

Also, a barrier pattern in parallax barrier 120 is required to be larger than or about the same size (area) as a display area of liquid crystal panel 110 (the area where pixels will be displayed). Therefore, with the conventional parallax barrier 120, the barrier pattern is fully formed over the whole parallax barrier 120.

However, in the conventional display device including the parallax barrier 120 and display panel 110 bonded together, as described in FIG. 10, peeling of parallax barrier 120 at the edge portions of the bonding surface occur. The reasons for this can be surmised as follows.

Firstly, the strength is different between the parallax barrier 120 with one substrate and the display panel 110 with two substrates bonded together. Furthermore, the parallax barrier 120 and display panel 110 are bonded by using resin layer 151 including an ultraviolet curing resin, and the resin layer 151 hardens by being irradiated by ultraviolet rays from above the parallax barrier 120. At this time, there is a portion in the resin layer 151 where ultraviolet rays inadequately irradiate due to the light-shielding layer 122 in the parallax barrier 120, and in this portion, resin layer 151 does not harden adequately and a lack in adhesion occurs.

After bonding the parallax barrier 120 and display panel 110, external influences such as heat cause strain due to the difference in thermal contraction rate between materials. If this strain is great, peeling occurs in the weakest portion of the bonding surface, in other words the edge portions of the bonding portions.

For example, if the polarizer 142 bonded with the parallax barrier 120 contracts, the barrier substrate 121 is pulled, thereby generating a warp at the edge portion of this barrier substrate 121. At this time, since the display panel 110 including two substrates bonded together has a certain strength, the display panel 110 is unlikely to be warped, but the adhesive layer 151 being the interface between the parallax barrier 120 and display panel 110 peels off.

SUMMARY OF THE INVENTION

In order to overcome the problems described above, preferred embodiments of the present invention provide a display device including a parallax barrier and a display panel bonded together with less occurrence of peeling in the bonding surface of the parallax barrier and the display panel.

A display device according to a preferred embodiment of the present invention includes an image generation device arranged to generate display images, and a parallax barrier including a light-shielding layer having a certain pattern disposed on a transparent substrate, the image generating device and the parallax barrier being bonded with a light-curing resin, wherein on an entire circumferential edge portion of a surface of the parallax barrier on which the image generation device is bonded with the light-curing resin, the parallax barrier has an area that does not include the light-shielding layer.

The display device preferably includes an image generation device (such as a liquid crystal display panel) and a parallax barrier bonded together by a light-curing resin. For example, in the case the display device is used as a 3D display device, the right-eye image and the left-eye image generated by the image generation device are separated into different display directions with certain viewing angles provided thereto respectively by the parallax barrier image.

The parallax barrier is generally a parallax barrier including a light-shielding layer formed with a certain pattern on a transparent substrate. These parallax barriers are bonded with an image generation device using a light-curing resin (adhesive layer), the light-shielding layer disposed on the parallax barrier blocks the ultraviolet rays, and so a lack of adhesion strength (the inadequacy of hardening in the adhesive layer) occurs, and becomes the cause for barrier peeling.

To solve this problem, according to the structure of the above-described preferred embodiment of the present invention, the parallax barrier includes an area that does not have the light-shielding layer on the entire circumferential edge portion of the adhesive planes, so in this area without the light-shielding layer, in other words, in the peripheral portions where peeling of parallax barrier most often occurs in conventional display devices, an adequate adhesion strength can be obtained, whereby the peeling of the parallax barrier and the image generation device at the bonding surface can be prevented.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Preferred embodiments of the present invention are described below with reference to FIGS. 1 to 5. A liquid crystal display device is illustrated as a display device according to preferred embodiments of the present invention in the following explanation. The display device according to preferred embodiments of the present invention is applicable to 3D display devices and also multiple-image display devices.

Figure 2:
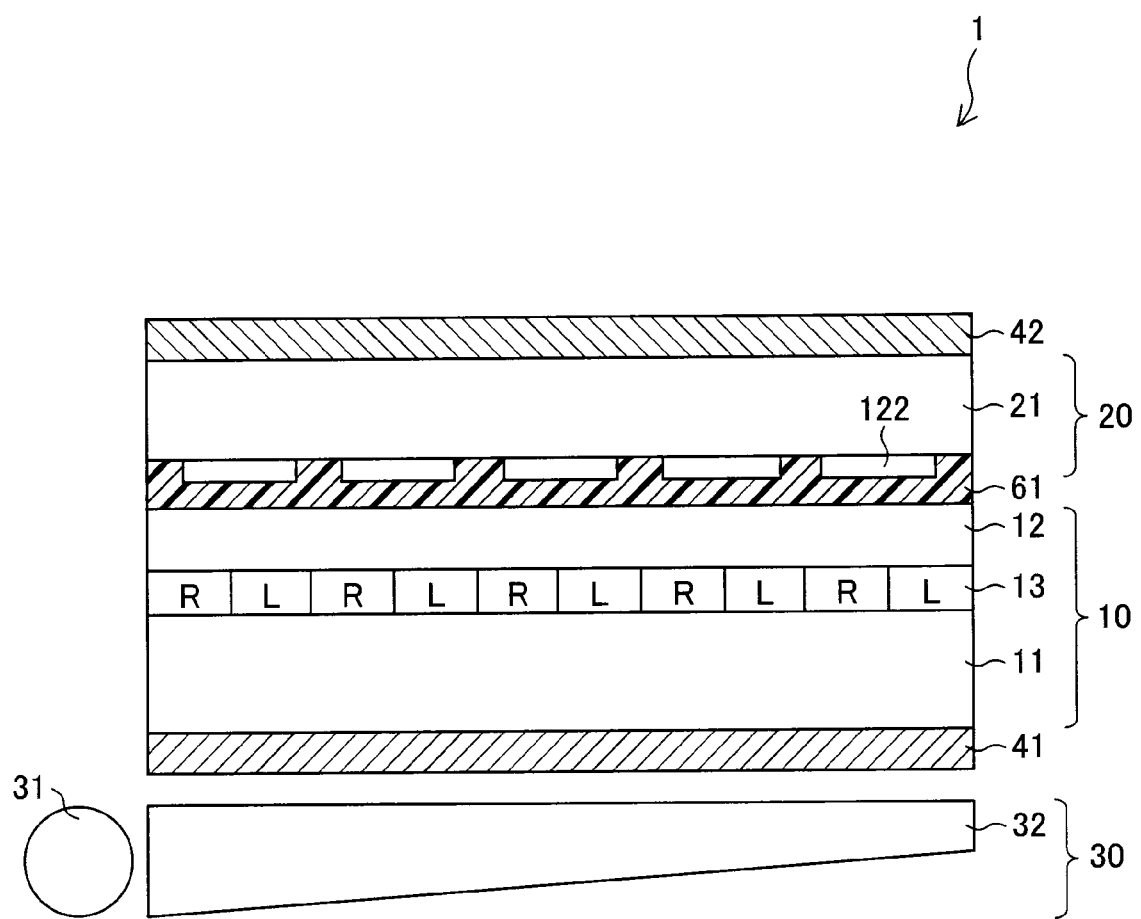
FIG. 2 is a cross sectional view schematically illustrating a structure of the display device.
Figure 3:
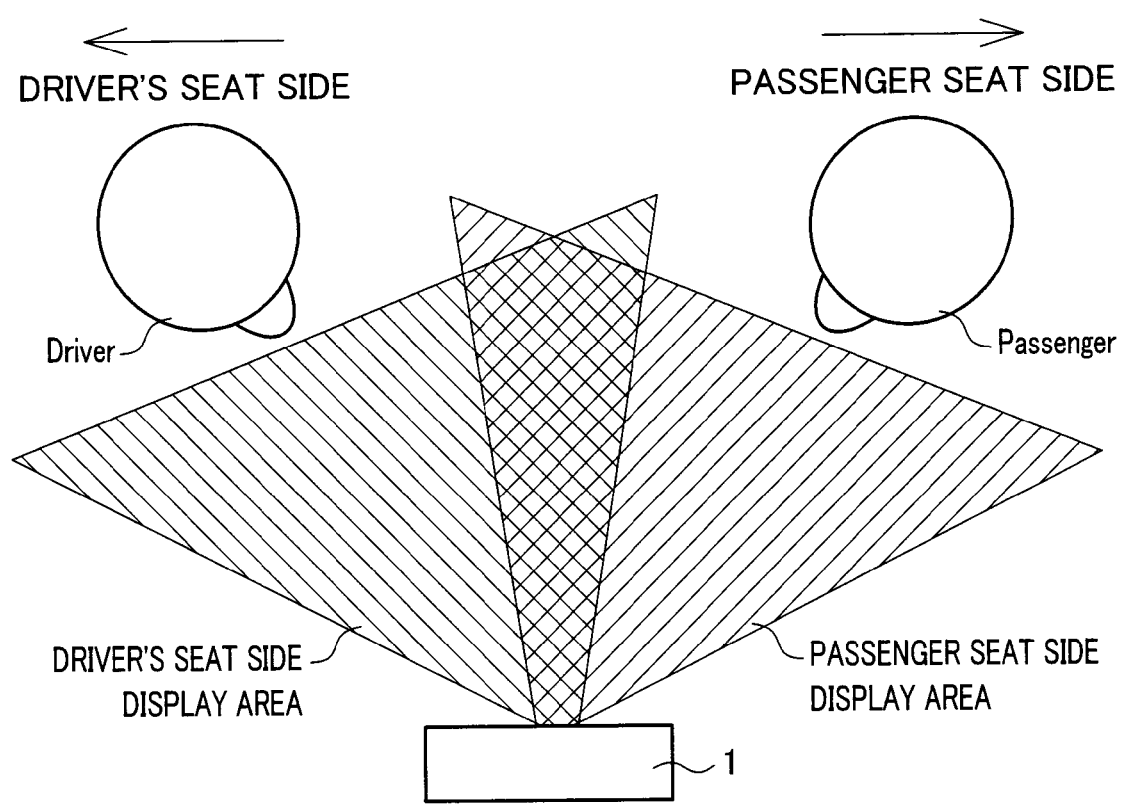
FIG. 3 is an explanatory view illustrating how different images are displayed to the driver's seat side and passenger seat side, respectively, in the display device.

Firstly, FIG. 2 schematically illustrates a structure of a liquid crystal display device 1 according to the present preferred embodiment. As illustrated in FIG. 2, the liquid crystal display device 1 preferably includes a display panel 10, a parallax barrier 20, a backlight 30, polarizers 41 and 42 and an adhesive layer 61.

The backlight 30 preferably includes a light source 31 and a reflection section 32, and by reflecting light irradiated from the light source 31 with the reflection section 32, light is irradiated towards the display panel 10. The light source 31 may be, for example, LED (light emitting diode), Cold Cathode Fluorescent Tube (CCFT), and Cold Cathode Fluorescent Lump (CCFL) or the like.

The display panel 10 preferably is an active-matrix type liquid crystal display panel with a liquid crystal layer 13 including Nematic liquid crystal sandwiched between a TFT (Thin Film Transistor) substrate 11 and a CF (Color Filter) substrate 12 facing each other.

In the TFT substrate 11, a plurality of data signal lines and a plurality of scanning signal lines intersecting with each data signal line respectively are provided, and pixels are provided for each intersection of the data signal lines and scanning signal lines.

With the display device 1, the TFT substrate 11 preferably is about 700 μm in thickness, for example. Also, on that surface of the TFT substrate 11 which faces the backlight 30, a polarizer 41 is provided. Also, on each of surfaces of the TFT substrate 11 and CF substrate 12 which face each other, an alignment film is provided (not illustrated). The alignment films have been subjected to an alignment process to have alignment directions crossing each other substantially at right degrees.

Also, on the CF substrate 12, a color filter layer (not illustrated) is provided. The color filter layer provides each R, G and B picture element to each pixel. The CF substrate 12 preferably is thinned to a thickness of about 50 μm, for example, by chemical etching process or mechanical process such as polishing.

The parallax barrier 20 preferably includes a barrier glass 21 and a barrier light-shielding layer 22. As the barrier glass 21, a transparent glass having a thickness of about 0.7 mm is preferably used, for example. Also, a barrier light-shielding layer 22 is formed on the barrier glass 21. Also, on the display side of the barrier glass 21 (opposite to the side thereof which faces the backlight 30), a polarizer 42 is arranged.

A barrier light-shielding layer 22 is arranged such that its columns are aligned in parallel or substantially in parallel with an extending direction of the pixel columns R and L, for example, like a row of stripes. However, the pattern configuration of barrier light-shielding layer 22 is not specifically limited, and may be a zigzag configuration or delta configuration other than the stripe configuration. The material for barrier light-shielding layer 22 is not specifically limited. For example, the light-shielding layer 22 may be formed using a photosensitive resin in which black pigment is dispersed, or be formed patterning a metal thin film. Also, the width of the columns structuring barrier light-shielding layer 22 extending in a perpendicular or substantially perpendicular direction towards the extending direction of pixel R and L (barrier width) preferably is about 40 μm, for example. Also, the pitch of each column structuring barrier light-shielding layer 22 (barrier pitch) is preferably set at about 129.99 μm, for example.

Also, each column of barrier light-shielding layer 22 is preferably set to correspond with each pixel column of display panel 10. That is to say, each column of barrier light-shielding layer 22 is set so to block a portion of the light irradiated from each pixel column of display panel 10 so it is not observed from the direction other than the display direction of each pixel.

Therefore, in the case liquid crystal display device 1 is used, for example, as an in-car display device, pixel column R for the driver's seat side can be observed from the driver's seat side but cannot be observed from the passenger seat side, and pixel column L can be observed from the passenger seat side but cannot be observed from the driver's seat side. Thus, with liquid crystal display device 1, it is possible to display different images towards the driver's seat side and the passenger seat side.

An adhesive layer 61 bonds the parallax barrier 20 and display panel 10 together, and is formed on the entire facing surfaces of parallax barrier 20 and display panel 10. In other words, the parallax barrier 20 and display panel 10 are bonded via the whole surfaces. As the adhesive layer 61, a photo-curing type adhesive (for example, ultraviolet curing resin) preferably is used, for example. Also, with the liquid crystal display device 1, the thickness of the adhesive layer 61 (the space between barrier glass 21 and CF substrate 12) preferably is about 40 μm, for example. Also, the adhesive layer 61 is preferably made of a material that keeps an elasticity of certain amount even after hardening.

In order to adequately display each image of liquid crystal display device 1 separated to the right side and the left side, it is necessary to accurately align the parallax barrier 20 and display panel 10. Therefore, it is preferable to take some measures for accurate alignment. For example it is preferable to create an alignment mark for both, and accurately align them referring to the alignment marks to arrange the alignment.

Figure 1:
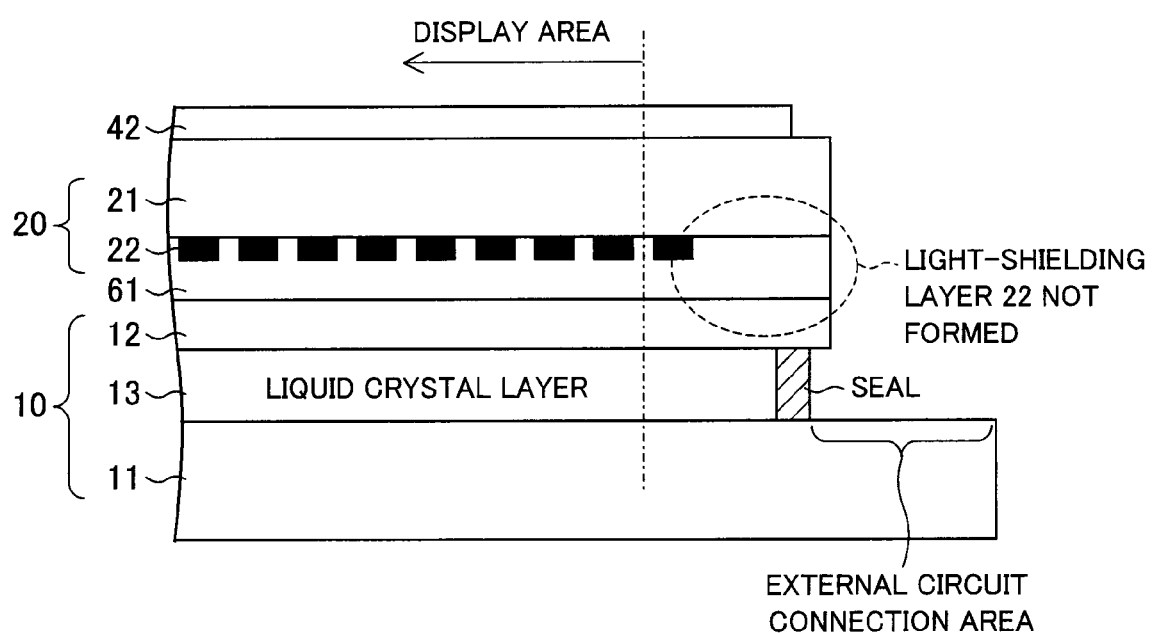
FIG. 1 is a cross sectional view illustrating a preferred embodiment of the present invention, illustrating adhesion of a display panel and a parallax barrier around edge portions of the display device.

Here, we will explain in detail the adhesion formation with parallax barrier 20 and display panel 10 in the liquid crystal display device, referring to FIG. 1. In other words, the present invention is provided to realize a structure with a display device including a parallax barrier and a display panel bonded together, with the less occurrence of peeling in the adhesive planes. FIG. 1 illustrates a vicinity of the edge portions of the adhesive planes of parallax barrier 20 and display panel 10.

Figure 4A:
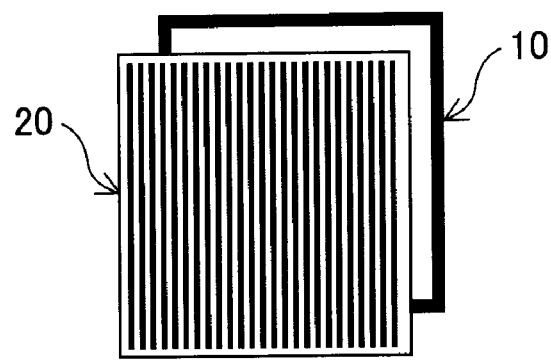
FIG. 4A is a plane view illustrating relationship between a pattern layout of the parallax barrier and the liquid crystal display panel, according to a preferred embodiment of the present invention.
Figure 4B:
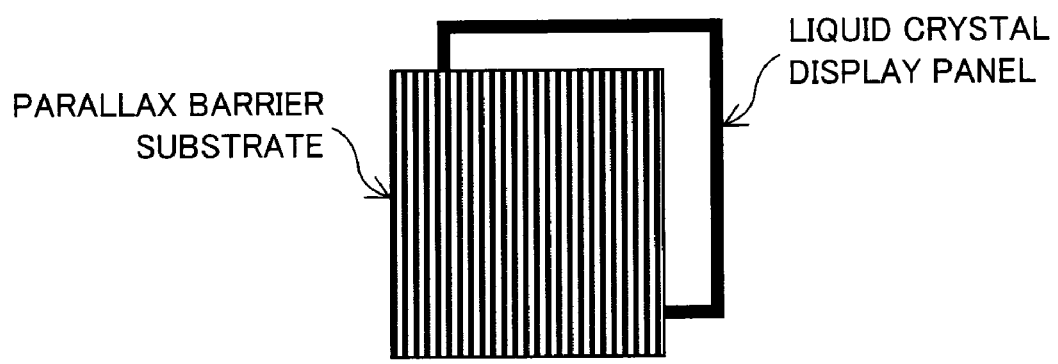
FIG. 4B is a plane view illustrating the relationship of the conventional pattern layout for the parallax barrier and the liquid crystal display panel.

As illustrated in FIG. 1, in the parallax barrier 20 according to the present preferred embodiment, the formation area of the barrier light-shielding layer 22 is allocated mostly within the display area of display panel 10. In other words, the parallax barrier 20, as illustrated in FIG. 4A, includes an area that does not include the barrier light-shielding layer 22. This area preferably occupies the whole of the peripheral portions of the parallax barrier 20. FIG. 4B illustrates the conventional parallax barrier for comparison, and with the conventional parallax barrier, a pattern of a light-shielding layer is fully formed on the barrier substrate.

In the parallax barrier 20, in the area without the light-shielding layer 22, the bonding procedures of parallax barrier 20 and display panel 10 will be performed without hindering the adhesive layer 61 including the photo-curing resin from being irradiated with light for curing the adhesive layer 61. Therefore, an adequate adhesion strength can be provided in the area without the barrier light-shielding layer 22, in other words, in the peripheral portions where the peeling of parallax barrier occurs most often with the conventional display devices, thereby preventing the peeling on the adhesive surface of the parallax barrier and the display panel. The area without the barrier light-shielding layer 22 can obtain enough adhesion strength to prevent the peeling on parallax barrier if the width is about 1 mm or more, for example. At this time, the unformed area is arranged so it does not overlap with the display area of display panel 10 (the area that the image actually is displayed).

Furthermore, as illustrated in FIG. 1, the pattern-formed area of the barrier light-shielding layer 22 is preferably larger than the corresponding display area of the display panel 10. There are two general purposes for the barrier light-shielding layer 22 arranged outside of the display area. Firstly is, barrier light-shielding layer 22 arranged outside the display area acts as a dummy barrier light-shielding layer, and has the purpose of attaining a uniform film thickness of the barrier light-shielding layer 22, thereby attaining the uniform pitch of adhesion between the parallax barrier 20 and display panel 10, and a greater adhesion allowance for the adhesion of the parallax barrier 20 and display panel 10 (to deal with adhesion misalignment). Secondly, depending on the alignment pattern of the pixel columns R and L, a barrier light-shielding layer 22 needs to be arranged also on the outside of the display area.

Also, in the liquid crystal display device 1 with the structure described in FIG. 1, the parallax barrier 20 is to be a smaller size than the substrate on the side of the adhesive planes of display panel 10 (in other words, CF substrate 12), so it does not protrude from the outer edge portion of display panel 10. This is a structure that is provided to prevent any hooking or cracks of the barrier glass 21 in the parallax barrier 20. Also, this structure facilitates the method of bonding the display panel 10 and parallax barrier 20 by fixing the display panel 10 to an installment unit of a bonding device so as to align the parallax barrier 20 to the fixed display panel 10.

Figure 5:
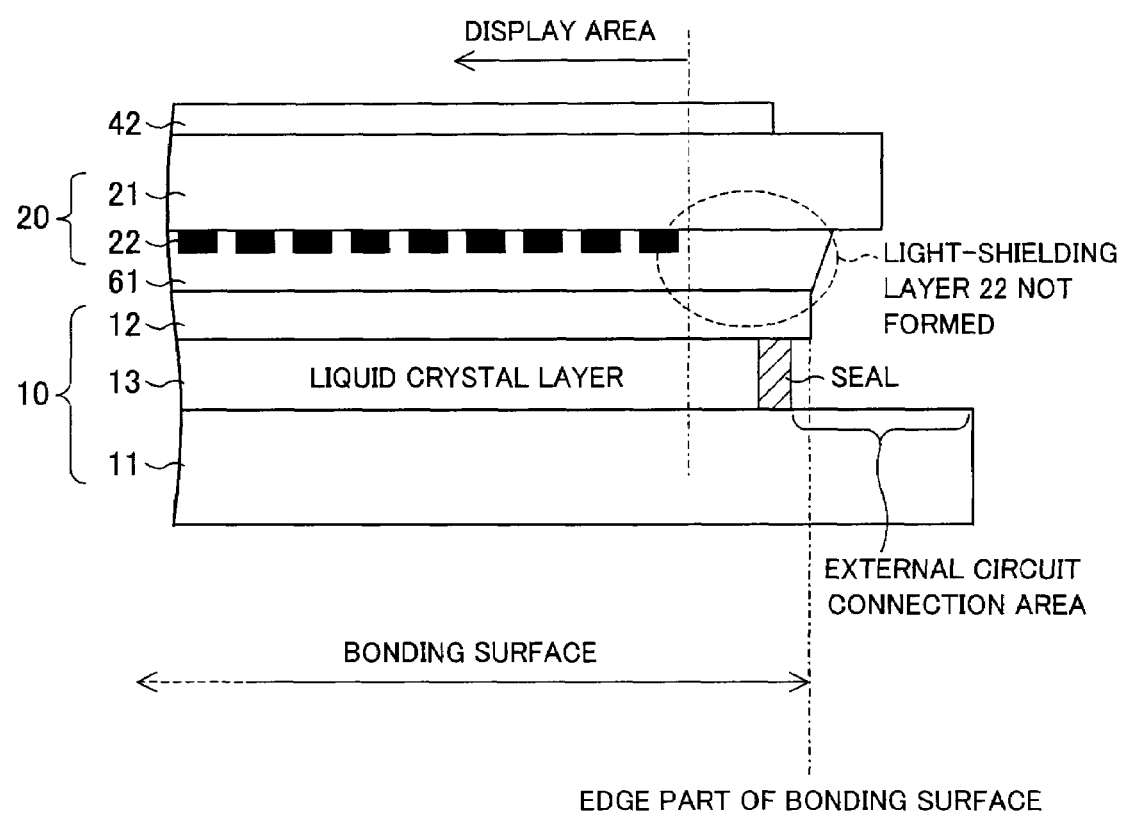
FIG. 5 is a cross sectional view illustrating another preferred embodiment of the present invention, illustrating adhesion of a display panel and a parallax barrier around an edge portion of the display device.
Figure 6:
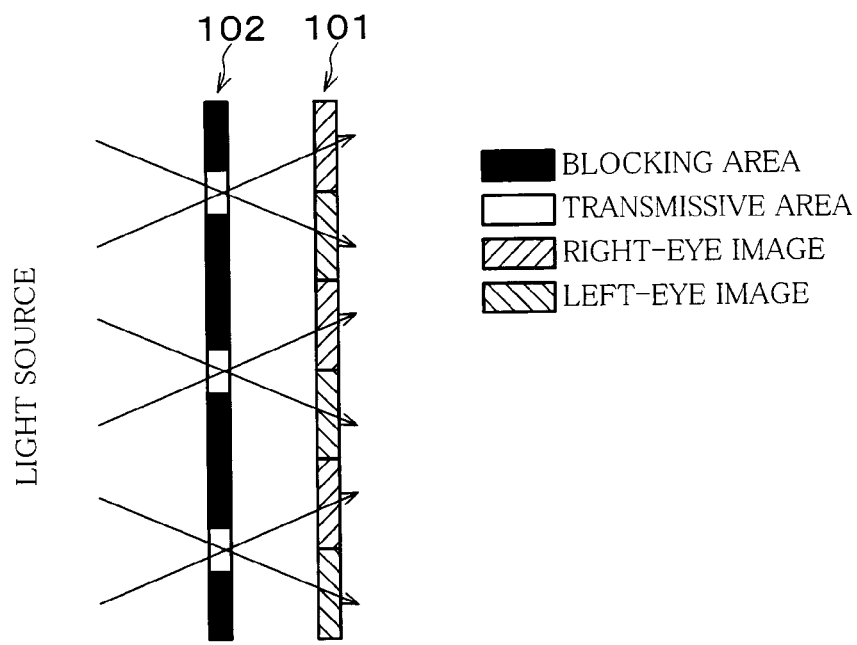
FIG. 6 is a figure illustrating an effect of a viewing angle by the parallax barrier in the case of performing 3D display.
Figure 7:
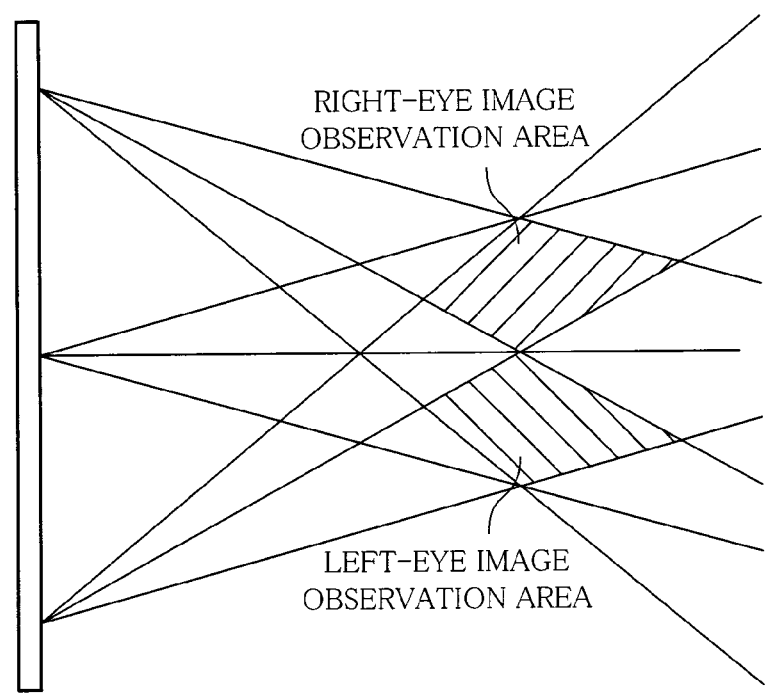
FIG. 7 is a view illustrating an observation area of a 3D display screen.
Figure 8A:
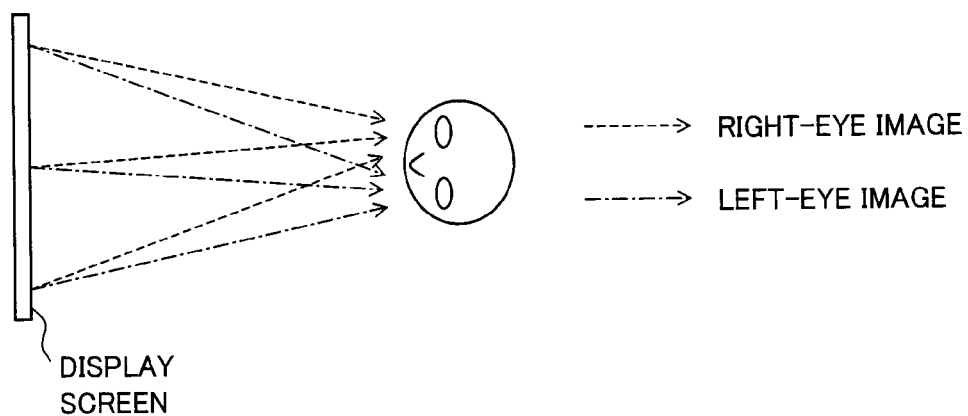
FIG. 8A is a view illustrating relationship between the display screen and the observer in the case of performing 3D display.
Figure 8B:
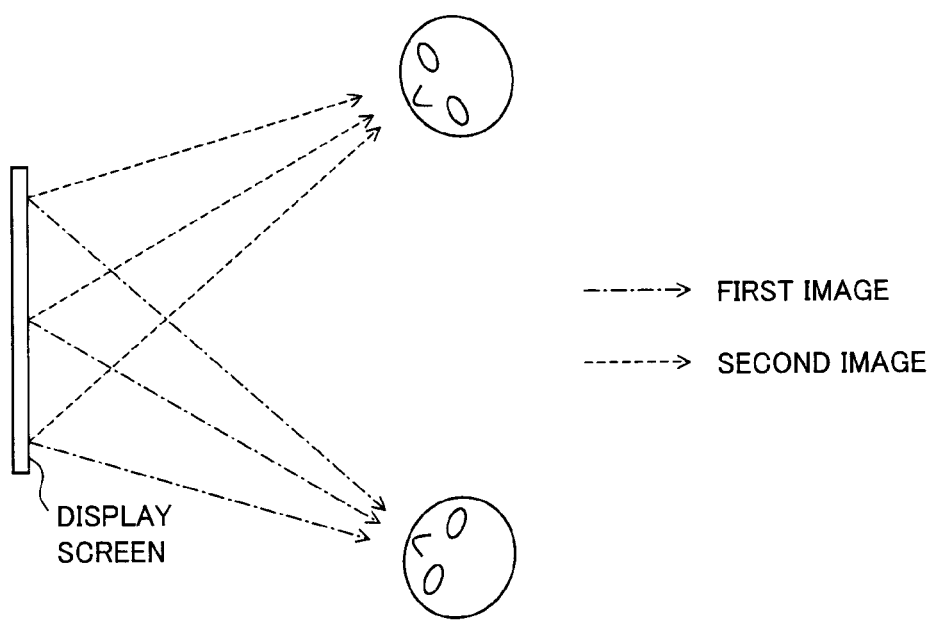
FIG. 8B is a view illustrating relationship between the display screen and the observer in the case of performing multiple image display.
Figure 9:
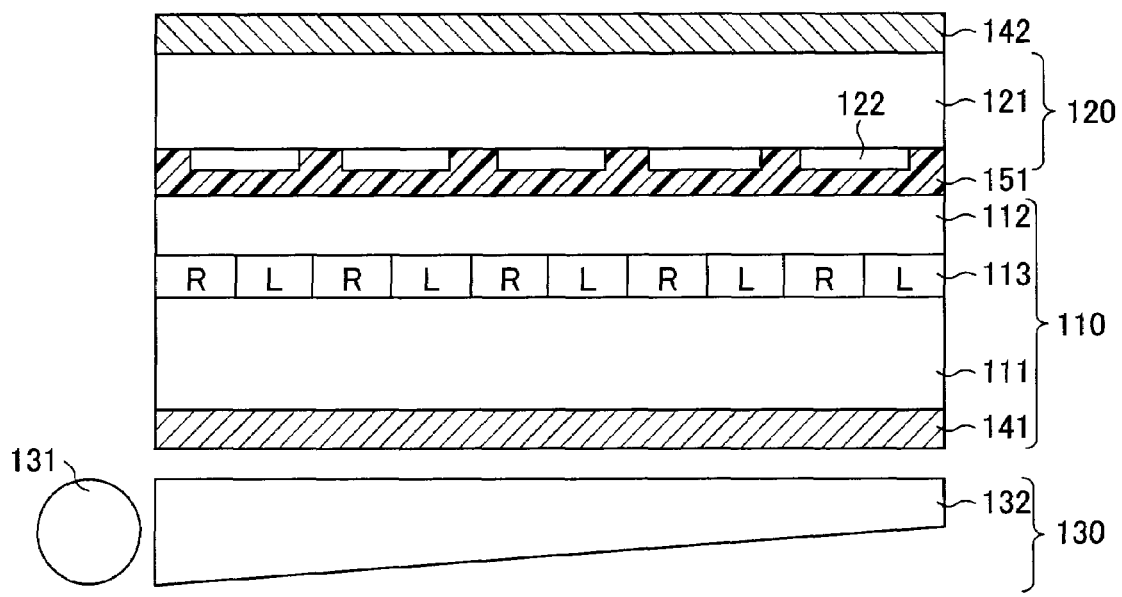
FIG. 9 is a cross sectional view schematically illustrating a structure of a conventional display device.
Figure 10:
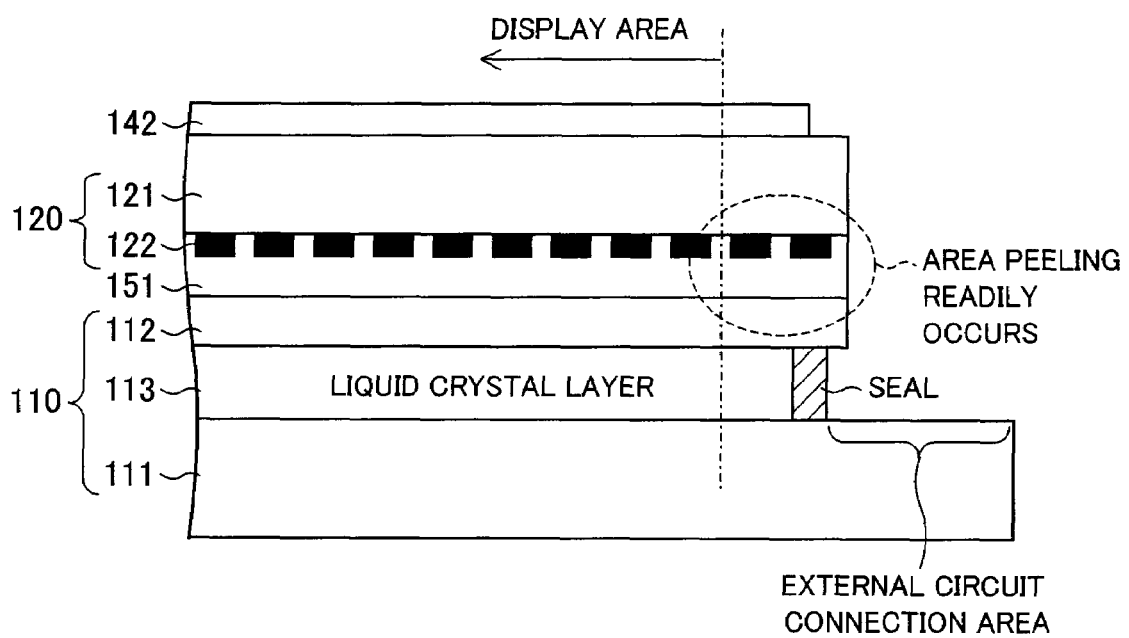
FIG. 10 is a cross sectional view illustrating adhesion of a display panel and a parallax barrier around an edge portion of a conventional display device.

However, the process of bonding the display panel 10 and parallax barrier 20 may adopt a method of fixing parallax barrier 20 to the installment unit of the bonding device, then aligning the display panel 10 towards the fixed parallax barrier 20 and bonding these together. In this case, it is preferable that the barrier glass 21 of parallax barrier 20 be a glass substrate with a certain thickness. Further, as illustrated in FIG. 5, the parallax barrier 20 may be a larger size than that substrate (in other words, CF substrate 12) of the display panel 10 to which the parallax barrier 20 is to be bonded.

In the case where the parallax barrier 20 has a larger size than the substrate of the display panel 10 to which it is to be bonded, the area without the barrier light-shielding layer 22 in the parallax barrier 20 is preferably formed around the whole circumferential edge of the adhesive surface, where the adhesive layer 61 is arranged therebetween. Here, the edge portion of the adhesive surfaces includes the edge portions of the area where all of the barrier glass 1, adhesive layer 61, and the substrate of the adhesive surface of the display panel 10 are provided in a laminated direction of the parallax barrier 20 and display panel 10.

The display device of the present invention is not limited to a liquid crystal display device as described above. Instead, a display panel combined with a parallax barrier, PDP panel and organic EL panel may also be used other than liquid crystal display panel. However, with a display device using a liquid crystal display panel, as described in FIG. 2, a polarizer is bonded with a parallax barrier. A warp is then easily generated due to the difference in thermal contraction rate between the barrier glass of the parallax barrier and the polarizer, and this warp may readily be the cause of peeling on the parallax barrier. Therefore, the present invention may be favorably used especially with display devices using liquid crystal display panels.

Also, the above-described preferred embodiment exemplifies the structure in which the bonding of the parallax barrier 20 and display panel 10 is carried out by bonding the display panel 10 with the side of the parallax barrier 20 on which the barrier light-shielding layer is formed. This structure protects the barrier light-shielding layer 22 in parallax barrier 20, or simplifies the pitch alignment of the display panel 10 and parallax barrier 20. Also, in the case display panel 10 is a liquid crystal display panel, this structure satisfies the necessity of bonding a polarizer on the opposite side of the bonding surface of parallax barrier 20 and display panel 10.

However, in the structure to make the barrier light-shielding layer 22, the adhesive plane for parallax barrier 20 is not essential in the present invention. In other words, at the time of bonding parallax barrier 20 and display panel 10, as long as the irradiation of ultraviolet rays is done from the side of parallax barrier 20, it is the same in the fact that barrier light-shielding layer 22 blocks the ultraviolet ray whichever way it is arranged, i.e., either having the adhesive plane on the light-shielding formed side or the other.

As described above, a display device according to a preferred embodiment of the present invention preferably includes an image generation device arranged to generate display images, and a parallax barrier including a light-shielding layer of a certain pattern disposed on a transparent substrate, the image generating device and the parallax barrier being bonded with a light-curing resin, wherein on an entire circumferential edge portion of a surface of the parallax barrier on which the image generation device is bonded with the light-curing resin, the parallax barrier has an area that does not include the light-shielding layer, i.e., an area where the light-shielding layer is not formed.

The display device preferably includes an image generation device (such as a liquid crystal display panel) and a parallax barrier bonded together by a light-curing resin. For example, in the case the display device is used as a 3D display device, the right-eye image and the left-eye image generated by the image generation device are separated into different display directions with certain viewing angles provided thereto respectively by the parallax barrier.

The parallax barrier is generally a parallax barrier preferably including a light-shielding layer formed with a certain pattern on a transparent substrate. In the case where these parallax barriers are bonded with an image generation device using a light-curing resin (adhesive layer), the light-shielding layer formed on the parallax barrier blocks the ultraviolet rays, and so a lack of adhesion strength (the inadequacy of hardening in the adhesive layer) occurs, and becomes the cause for barrier peeling.

To solve this problem, according to the unique structure of preferred embodiments of the present invention, the parallax barrier includes an area that does not have the light-shielding layer formed thereon preferably on the entire circumferential edge portion of the adhesive planes, so in this area without the light-shielding layer, in other words, in the peripheral portions where peeling of the parallax barrier occurs most often in conventional display devices, an adequate adhesion strength can be obtained, whereby the peeling of the parallax barrier and the image generation device at the bonding surface can be prevented.

Furthermore, the display device is preferably arranged such that the parallax barrier is bonded in such a manner that it does not protrude beyond the image generation device; and preferably on an entire circumferential edge portion of the parallax barrier, the parallax barrier has an area that does not include the light-shielding layer, i.e., an area where the light-shielding layer is not formed.

The display device is preferably arranged such that the area without the light-shielding layer in the parallax barrier has a width of about 1 mm or more, for example. As an alternative, the display device is preferably arranged such that the area without the formation of the light-shielding layer in the parallax barrier has a width of about 1 mm or more from the edge portion of the parallax barrier, for example.

According to these unique structures, it is possible to obtain adequate adhesion strength to prevent the peeling of the parallax barrier.

Moreover, the display device is preferably arranged such that the area without the light-shielding layer in the parallax barrier has a width of about 1 mm or more from the edge portion of the parallax barrier, and the light-shielding layer of the certain pattern on the transparent substrate has an area greater than a display area of the image generation device.

In this unique structure, the pattern formation area of the light-shielding layer is formed also on the outside of the display area of the corresponding image generation device. In this case, the light-shielding layer disposed on the outside of the display area acts as a dummy barrier light-shielding layer, and can obtain effects such as uniform film thickness in the light-shielding layer, uniform adhesion pitch between the parallax barrier and the image generation device, and a greater bonding allowance between the parallax barrier and the image generation device (to deal with bonding misalignment).

Furthermore, the display device is especially preferably arranged such that the image generation device is a liquid crystal display panel. That is, with display devices using liquid crystal display panels, a polarizer is bonded with a parallax barrier. A warp then readily generates due to the difference in heat contraction between the transparent substrate (usually, glass substrate) of the parallax barrier and the polarizer, and this warp can readily be the cause for parallax barrier peeling. Therefore, the present invention can be favorably used with display devices especially using a liquid crystal display device.

The present invention being thus described, it will be obvious that the same way may be varied in many ways. Such variations are not to be regarded as a departure from the spirit and scope of the present invention, and will not be interpreted in a limited way. The scope of the present invention is as described in the claims, and is not restrained from the description. Furthermore, all such modifications as would be obvious to one skilled in the art are intended to be included within the scope of the following claims.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A display device comprising:
an image generation device arranged to generate display images; and
a parallax barrier including a light-shielding layer disposed on a transparent substrate, the image generation device and the parallax barrier being bonded with a light-curing resin; wherein
on a circumferential edge portion of a surface of the parallax barrier on which the image generation device is bonded with said light-curing resin, the parallax barrier has an area that does not include said light-shielding layer.

2. A display device according to claim 1, wherein said parallax barrier is bonded in such a manner that it does not protrude beyond the image generation device, and on an entire circumference of the parallax barrier, the parallax barrier has an area that does not include said light-shielding layer.

3. A display device according to claim 1, wherein the area without the light-shielding layer on the parallax barrier has a width of about 1 mm or more.

4. A display device according to claim 3, wherein the area without the light-shielding layer on the parallax barrier has a width of about 1 mm or more from the edge portion of the parallax barrier, and the light-shielding layer has a certain pattern disposed on the transparent substrate that has an area greater than a display area of the image generation device.

5. A display device according to claim 2, wherein the area without the light-shielding layer on the parallax barrier has a width of about 1 mm or more from the edge portion of the parallax barrier.

6. A display device according to claim 5, wherein the area without the light-shielding layer on the parallax barrier has a width of about 1 mm or more from the edge portion of the parallax barrier, and the light-shielding layer has a certain pattern disposed on the transparent substrate that has an area greater than a display area of the image generation device.

7. A display device according to claim 1, wherein said image generation device is a liquid crystal display panel.

* * * * *